US012612963B1

(12) United States Patent
Geiser et al.

(10) Patent No.: US 12,612,963 B1
(45) Date of Patent: Apr. 28, 2026

(54) EXTENDED DIFFERENTIAL OUTPUT GEAR

(71) Applicant: Schaeffler Technologies AG & Co. KG, Herzogenaurach (DE)

(72) Inventors: Jordan Geiser, Massillon, OH (US); Gregory Heeke, Wooster, OH (US); David Burky, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/966,244

(22) Filed: Dec. 3, 2024

(51) Int. Cl.
| | |
|---|---|
| *F16H 48/38* | (2012.01) |
| *B60B 35/16* | (2006.01) |
| *B60K 17/16* | (2006.01) |
| *F16H 48/10* | (2012.01) |
| *F16H 48/40* | (2012.01) |
| *F16H 57/037* | (2012.01) |
| *F16H 48/11* | (2012.01) |
| *F16H 57/02* | (2012.01) |

(52) U.S. Cl.
CPC ............ *F16H 48/38* (2013.01); *B60B 35/16* (2013.01); *B60K 17/165* (2013.01); *F16H 48/10* (2013.01); *F16H 48/40* (2013.01); *F16H 57/037* (2013.01); *F16H 48/11* (2013.01); *F16H 2057/02034* (2013.01); *F16H 2057/02052* (2013.01)

(58) Field of Classification Search
CPC ... F16H 2048/106; F16H 48/11; F16H 48/285
See application file for complete search history.

(56) References Cited

U.S. PATENT DOCUMENTS

| | | | | |
|---|---|---|---|---|
| 4,625,585 A | * | 12/1986 | Dissett .................... | F16H 48/11 475/226 |
| 5,362,284 A | * | 11/1994 | Brewer ................... | F16H 48/10 475/252 |
| 5,839,985 A | * | 11/1998 | Teraoka .................. | F16H 48/10 475/252 |
| 6,165,095 A | * | 12/2000 | Till ......................... | F16H 48/34 192/84.2 |
| 6,210,299 B1 | | 4/2001 | Yoshioka | |
| 6,309,321 B1 | * | 10/2001 | Valente ................... | F16H 48/11 475/249 |
| 7,278,945 B2 | * | 10/2007 | Hamrin ................. | F16H 48/295 475/150 |

(Continued)

FOREIGN PATENT DOCUMENTS

| | | | | | |
|---|---|---|---|---|---|
| KR | 20240119566 A | * | 8/2024 | ............. | B60K 17/02 |
| WO | WO-2024224592 A1 | * | 10/2024 | ............. | F16H 48/11 |

*Primary Examiner* — Sherry L Estremsky

(57) ABSTRACT

An extended differential output gear including a gear body portion and a tubular portion. The gear body portion includes an outer gear portion and an inner spline portion at least partially overlapping the outer gear portion in a radial direction. The tubular portion extends axially from the inner spline portion. The tubular portion may include a speed sensor target. The tubular portion may include a thicker portion adjacent to the inner spline portion, and a thinner portion adjacent to the thicker portion. The tubular portion may include a stepped tube pressed onto the thinner portion, and the stepped tube may include a speed sensor target. A differential assembly including the extended differential output gear and an axle assembly including the differential assembly are also disclosed.

18 Claims, 2 Drawing Sheets

(56) References Cited

U.S. PATENT DOCUMENTS

| | | | | |
|---|---|---|---|---|
| 7,837,588 | B2 * | 11/2010 | Valente | F16H 48/285 |
| | | | | 475/252 |
| 9,267,593 | B2 * | 2/2016 | Biermann | F16H 48/11 |
| 9,347,542 | B2 * | 5/2016 | Gutsmiedl | F16H 48/285 |
| 9,897,186 | B2 * | 2/2018 | Jin | F16H 48/10 |
| 10,527,143 | B2 * | 1/2020 | Wurzberger | F16H 1/28 |
| 11,186,168 | B1 * | 11/2021 | Kim | B60K 17/165 |
| 11,204,085 | B2 * | 12/2021 | Otani | F16H 48/11 |
| 11,236,811 | B1 * | 2/2022 | Hasson, Jr. | B60K 17/346 |
| 12,072,013 | B2 * | 8/2024 | Lee | F16H 57/042 |
| 12,392,402 | B1 * | 8/2025 | Kim | F16H 57/12 |

* cited by examiner

EXTENDED DIFFERENTIAL OUTPUT GEAR

TECHNICAL FIELD

The present disclosure relates generally to a differential output gear, and more specifically to an extended differential output gear.

BACKGROUND

Axle assemblies are known from U.S. Pat. No. 6,210,299 titled TUBULAR BEARM MOTOR VEHICLE DIFFERENTIAL AXLE ASSEMBLY to Yoshioka, for example.

SUMMARY

Example aspects broadly comprise an extended differential output gear including a gear body portion and a tubular portion. The gear body portion includes an outer gear portion and an inner spline portion at least partially overlapping the outer gear portion in a radial direction. The tubular portion extends axially from the inner spline portion. In an example embodiment, the tubular portion includes a speed sensor target. In some example embodiments, the tubular portion includes a thicker portion adjacent to the inner spline portion, and a thinner portion adjacent to the thicker portion. In an example embodiment, the tubular portion includes a stepped tube pressed onto the thinner portion, and the stepped tube includes a speed sensor target.

In some example embodiments, the gear body portion includes a pair of annular surfaces arranged at axially opposite ends of the gear body portion. In an example embodiments, the gear body portion has a first axial length measured between the pair of annular surfaces, and the outer gear portion has a second axial length, less than the first axial length. In some example embodiments, the gear body portion also includes a first bore axially adjacent to the inner spline portion. In an example embodiment, the gear body also includes comprises a second bore axially adjacent to the first bore. In an example embodiment, the extended differential output gear also includes a plug press-fitted into the first bore.

Other example aspects broadly comprise a differential assembly including a housing, a first extended differential output gear, disposed in the housing, and a second extended differential output gear, disposed in the housing and coaxial with the first extended differential output gear. In an example embodiment, the differential assembly also includes a first plurality of pinion gears disposed radially outside of and in meshing engagement with the first extended differential output gear output gear portion, and a second plurality of pinion gears disposed radially outside of and in meshing engagement with the second extended differential output gear output gear portion and the first plurality of pinion gears.

In an example embodiment, the housing includes a first tubular portion having a first distal end, and the tubular portion of the first extended differential gear extends inside of the first tubular portion beyond the first distal end. In some example embodiments, the first extended differential output gear tubular portion includes a thicker portion adjacent to the inner spline portion arranged to radially position the first extended differential output gear in the housing. In an example embodiment, the first extended differential output gear tubular portion has a thinner portion adjacent to the thicker portion arranged as a sealing surface.

Other example aspects broadly comprise an axle assembly including an axle housing and the differential assembly disposed in the axle housing. In an example embodiment, the first extended gear tubular portion is sealed to the axle housing. In an example embodiment, the axle assembly also includes a speed sensor disposed in the axle housing, and the first extended gear tubular portion has a speed sensor target aligned with the speed sensor.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figures 1, 2, 3:
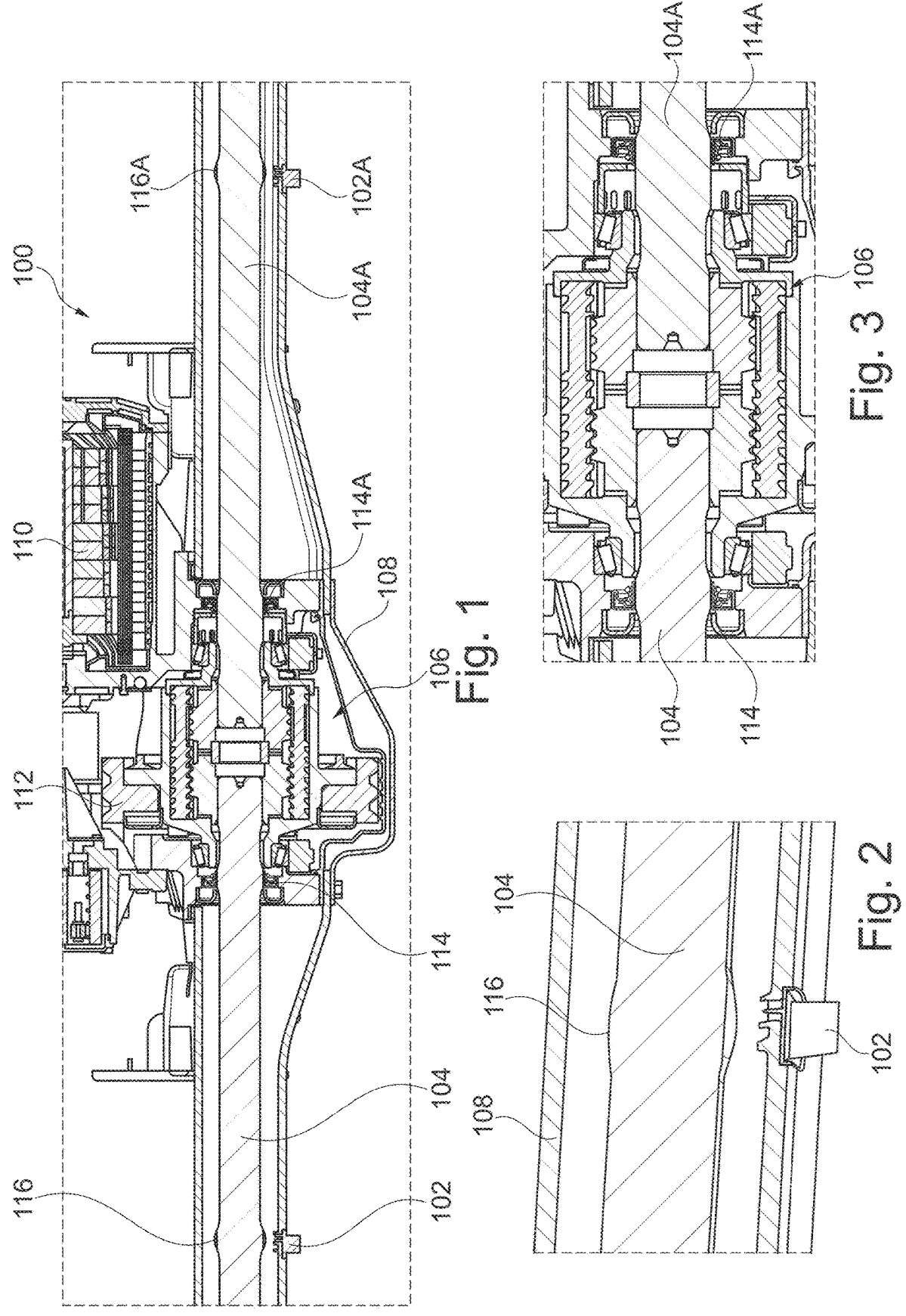
FIG. 1 illustrates a cross-section view of an axle assembly.
FIG. 2 illustrates a detail view of a speed sensor and a portion of an axle of the axle assembly of FIG. 1.
FIG. 3 illustrates a detail view of a differential assembly of the axle assembly of FIG. 1.

The following description is made with reference to FIGS. 1-3. FIG. 1 illustrates a cross-section of axle assembly 100. FIG. 2 illustrates a detail view of speed sensor 102 and a portion of axle shaft 104 of axle assembly 100 of FIG. 1. FIG. 3 illustrates a detail view of differential assembly 106 of axle assembly 100 of FIG. 1.

Axle assembly 100 includes axle housing 108. Axle assembly 100 may be an axle assembly for an electric vehicle, for example. In the view shown in FIG. 1, electric motor 110 and drivetrain 112 are only partially shown. The axle assembly also includes differential assembly 106 and axle shafts 104 and 104A disposed in the axle housing. Shafts 104 and 104A are sealed to axle housing 108 via seals 114 and 114A, respectively. Axle assembly 100 also includes speed sensors 102 and 102A, disposed in the axle housing. Axle shafts 104 and 104A include respective speed sensor targets 116 and 116A, aligned with speed sensors 116 and 116A, respectively. The targets may be a spline, teeth or another periodic feature embedded in or fixed to the axle, for example.

Figure 4:
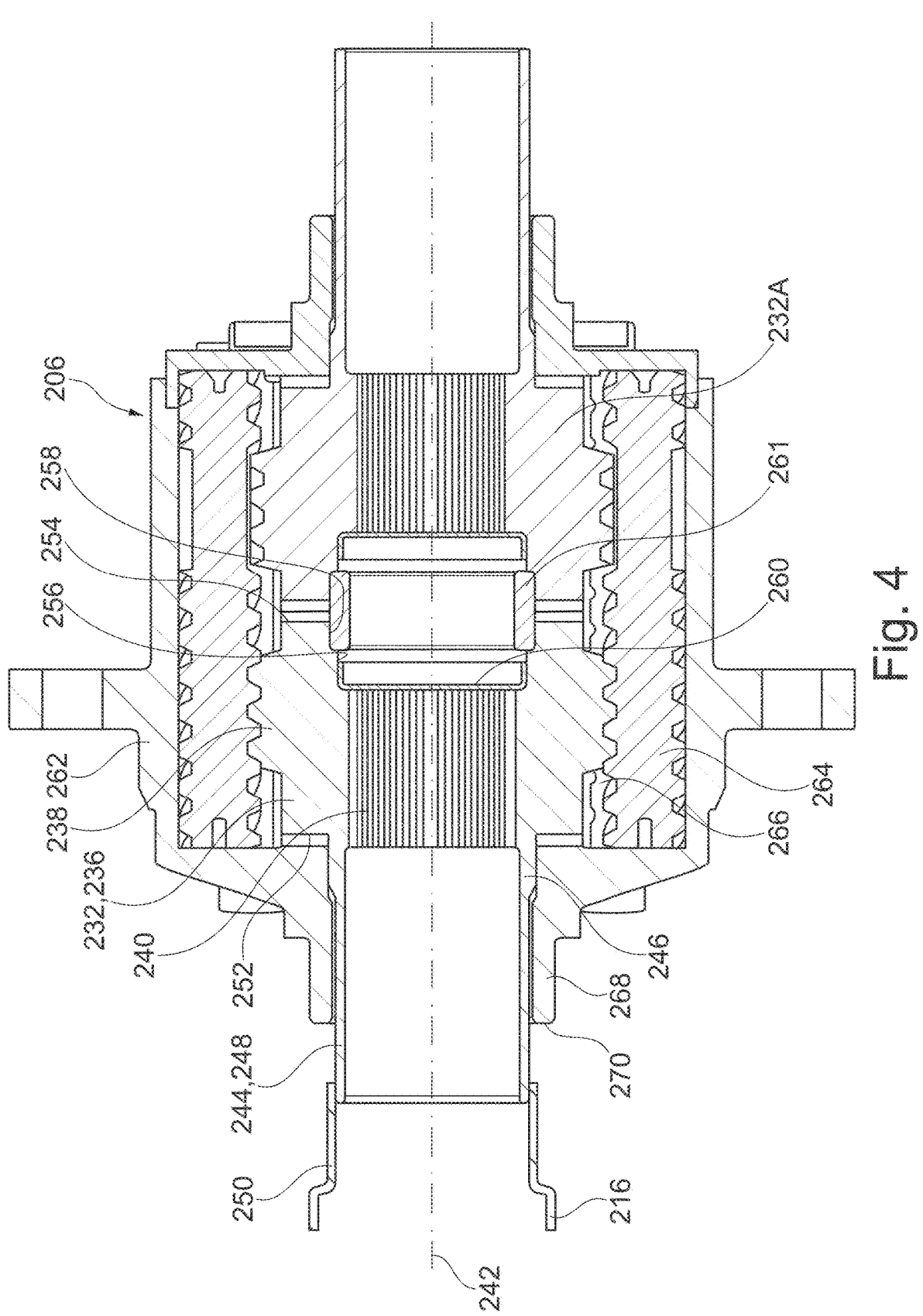
FIG. 4 illustrates a cross-section view of an alternative differential assembly of the axle assembly of FIG. 1 having extended differential output gears.

The following description is made with reference to FIG. 4. FIG. 4 illustrates a cross-section view of alternative differential assembly 206 of axle assembly 100 of FIG. 1 having extended differential output gears 232 and 232A. Extended differential output gear 232 includes gear body portion 236 with outer gear portion 238 and inner spline portion 240 at least partially overlapping the outer gear portion in a radial direction. That is, a line can be drawn radially outward from axis 242 that intersects both the outer gear portion and the inner spline portion. Extended differential output gear 232 also includes tubular portion 244 extending axially from the inner spline portion. Tubular portion 244 includes speed sensor target 216, similar to targets 116 and 116A described above.

Tubular portion 244 includes thicker portion 246 adjacent to inner spline portion 240, and thinner portion 248 adjacent to the thicker portion. That is, the tubular portion has a stepped profile that gets thinner moving away from gear body portion 236. In the embodiment shown, tubular portion 244 includes stepped tube 250 fixed to the thinner portion and the stepped tube includes speed sensor target 216. Tube 250 may be made by stamping, for example, and fixed by press-fitting, welding or adhesives, for example. The larger diameter of speed sensor target 216 allows more teeth and greater resolution for improved sensing performance compared with target 116 on axle shaft 104 described above. Other embodiments (not shown) may include the target formed directly into the tubular portion, for example.

Gear body portion 236 includes annular surfaces 252 and 254 arranged at axially opposite ends of the gear body portion. Gear body portion 236 includes an axial length measured between the pair of annular surfaces, and the outer gear portion has axial length, less than the gar body portion axial length. In other words, the length of the outer gear is less than the length of the gear body portion. Gear body portion 236 includes bore 256, axially adjacent to inner spline portion 240, and bore 258, axially adjacent to the bore 256. Extended differential output gear 232 includes plug 260 press-fitted into bore 256 and spacer 261 installed in bore 258. The plug may be a formed, steel plug arranged to seal oil in differential assembly 206 from entering inner spline portion 240, for example.

Differential assembly 206 includes housing 262, extended differential output gear 232, disposed in the housing, and extended differential output gear 232A, disposed in the housing and coaxial with extended differential output gear 232. In some embodiments, extended differential output gear 232A is identical to extended output gear 232, for example. Differential assembly 206 also includes pinion gears 264 disposed radially outside of and in meshing engagement with extended differential output gear 232 output gear portion 238, and pinion gears 266 disposed radially outside of and in meshing engagement with second extended differential output gear 232A output gear portion 238A and pinion gears 264. In other words, the sets of pinion gears are in meshing engagement with each other, and each set is exclusively meshed with one and only one of the output gears.

Housing 262 includes tubular portion 268 with distal end 270. When installed in the housing, tubular portion 244 of extended differential gear 232 extends inside of tubular portion 268 beyond distal end 270. Thicker portion 246 is arranged to radially position extended differential output gear 232 in the housing. That is, the thicker portion is configured to fit closely within tubular portion 268 to limit radial travel of the extended differential gear in the housing. Thinner portion 248 is arranged as a sealing surface, similar to axle shaft 116 described above. In other words, when installed in an axle assembly, the thinner portion extends along the axle shaft so that a seal, similar to seal 114 described above, contacts the thinner portion to form a seal therewith. Other embodiments (not shown) may include differential gear tubular portion 244 having a constant thickness, and an end portion of housing tubular portion 268, opposite distal end 270, extending radially inwards to provide radial positioning to the differential gear.

Differential assembly 206 may be disposed in an axle housing, similar to axle housing 108 described above, as part of an axle assembly, similar to axle assembly 100 described above. In other words, axle assembly 100 may include differential assembly 206 in place of differential assembly 106 described above. In such a device, tubular portion 244 is sealed to the axle housing as described above, and speed sensor target 216 is aligned with speed sensor 102. Therefore, in combination with plug 260, differential assembly 206 is entirely sealed and axles (similar to axles 104 and 104a described above) can be more easily serviced (e.g., removed) without risk of damaging seals or leaking differential fluid.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Axle assembly
102 Speed sensor
102A Speed sensor
104 Axle
104A Axle
106 Differential assembly
108 Axle housing
110 Electric motor
112 Drivetrain
114 Seal 114A Seal
116 Speed sensor target
116A Speed sensor target
206 Differential assembly
216 Speed sensor target
232 Extended differential output gear (first)
232A Extended differential output gear (second)
236 Gear body portion
238 Outer gear portion
240 Inner spline portion
242 Axis
244 Tubular portion
246 Thicker portion
248 Thinner portion
250 Stepped tube
252 Annular surface (gear body portion)
254 Annular surface (gear body portion)
256 Bore (first)
258 Bore (second)
260 Plug
261 Spacer
262 Housing
264 Pinion gears (first)
266 Pinion gears (second)
268 Tubular portion (housing)
270 Distal end (tubular portion)

What is claimed is:

1. An extended differential output gear, comprising:
a gear body portion comprising:
an outer gear portion; and
an inner spline portion at least partially overlapping the outer gear portion in a radial direction; and
a tubular portion extending axially from the inner spline portion and comprising a speed sensor target.

2. The extended differential output gear of claim 1, wherein the tubular portion comprises:
a thicker portion adjacent to the inner spline portion; and
a thinner portion adjacent to the thicker portion.

3. The extended differential output gear of claim 2, wherein:
the tubular portion comprises a stepped tube pressed onto the thinner portion; and
the stepped tube comprises the speed sensor target.

4. The extended differential output gear of claim 1, wherein the gear body portion comprises a pair of annular surfaces arranged at axially opposite ends of the gear body portion.

5. The extended differential output gear of claim 4, wherein:
the gear body portion comprises a first axial length measured between the pair of annular surfaces; and
the outer gear portion comprises a second axial length, less than the first axial length.

6. The extended differential output gear of claim 1, wherein the gear body portion further comprises a first bore axially adjacent to the inner spline portion.

7. The extended differential output gear of claim 6, wherein the gear body portion further comprises a second bore axially adjacent to the first bore.

8. The extended differential output gear of claim 6, further comprising a plug press-fitted into the first bore.

9. A differential assembly, comprising:
a housing;
a first extended differential output gear of claim 1, disposed in the housing; and a second extended differential output gear of claim 1, disposed in the housing and coaxial with the first extended differential output gear.

10. The differential assembly of claim 9, further comprising:
a first plurality of pinion gears disposed radially outside of and in meshing engagement with the first extended differential output gear output outer gear portion; and
a second plurality of pinion gears disposed radially outside of and in meshing engagement with the second extended differential output gear output outer gear portion and the first plurality of pinion gears.

11. The differential assembly of claim 9, wherein:
the housing comprises a first tubular portion having a first distal end; and
the tubular portion of the first extended differential output gear extends inside of the first tubular portion beyond the first distal end.

12. The differential assembly of claim 9, wherein:
the first extended differential output gear tubular portion comprises a thicker portion adjacent to the inner spline portion arranged to radially position the first extended differential output gear in the housing.

13. The differential assembly of claim 12, wherein:
the first extended differential output gear tubular portion comprises a thinner portion adjacent to the thicker portion arranged as a sealing surface.

14. An axle assembly, comprising:
an axle housing; and
the differential assembly of claim 9 disposed in the axle housing.

15. The axle assembly of claim 14, wherein the first extended differential output gear tubular portion is sealed to the axle housing.

16. The axle assembly of claim 14, further comprising a speed sensor disposed in the axle housing, wherein the speed sensor target is aligned with the speed sensor.

17. An extended differential output gear, comprising:
a gear body portion comprising:
an outer gear portion; and
an inner spline portion at least partially overlapping the outer gear portion in a radial direction; and
a tubular portion extending axially from the inner spline portion, the tubular portion comprising:
a thicker portion adjacent to the inner spline portion;
a thinner portion adjacent to the thicker portion; and
a stepped tube pressed onto the thinner portion, the stepped tube comprising a speed sensor target.

18. An axle assembly, comprising:
an axle housing;
a differential assembly disposed in the axle housing, the differential assembly comprising:
a housing;
a first extended differential output gear disposed in the housing and comprising a speed sensor target; and
a second extended differential output gear disposed in the housing and coaxial with the first extended differential output gear, each of the first extended differential output gear and the second extended differential output gear comprising:
a gear body portion comprising:
an outer gear portion; and
an inner spline portion at least partially overlapping the outer gear portion in a radial direction; and
a tubular portion extending axially from the inner spline portion; and a speed sensor disposed in the axle housing and aligned
   with the speed sensor target.

* * * * *